United States Patent

Muller et al.

[11] Patent Number: 5,865,039
[45] Date of Patent: *Feb. 2, 1999

[54] METHOD FOR OPERATING AN ABSORPTION REFRIGERATION UNIT AS WELL AS AN ABSORPTION REFRIGERATION UNIT

[75] Inventors: Volker Muller, Siegen, Germany; Eva Haegerstrand, Frauenfeld, Switzerland; Manfred Lorek, Siegen, Germany

[73] Assignee: Electrolux Siegen GmbH, Siegen, Germany

[*] Notice: This patent issued on a continued prosecution application filed under 37 CFR 1.53(d), and is subject to the twenty year patent term provisions of 35 U.S.C. 154(a)(2).

[21] Appl. No.: 635,154

[22] Filed: Apr. 23, 1996

[30] Foreign Application Priority Data

May 5, 1995 [DE] Germany ............... 195 16 630.2

[51] Int. Cl.$^6$ ..................................................... F25B 15/10
[52] U.S. Cl. ............................................................. 62/490
[58] Field of Search ............................ 62/101, 103, 148, 62/476, 490, 483, 495, 497

[56] References Cited

U.S. PATENT DOCUMENTS

| | | | |
|---|---|---|---|
| 3,807,189 | 4/1974 | Eber et al. ................... | 62/490 |
| 3,874,193 | 4/1975 | Reistad ....................... | 62/490 |
| 4,257,758 | 3/1981 | Blomberg .................... | 62/148 |
| 4,362,029 | 12/1982 | Blomberg et al. ........... | 62/497 |
| 5,138,846 | 8/1992 | Ogawa et al. ................ | 62/148 |
| 5,156,013 | 10/1992 | Arima et al. ................. | 62/148 |

FOREIGN PATENT DOCUMENTS

404032668  2/1992  Japan .......................... 62/148

*Primary Examiner*—William Doerrler
*Attorney, Agent, or Firm*—Pearne, Gordon, McCoy & Granger LLP

[57] ABSTRACT

In a method for operating a refrigerating unit including an expeller, condenser, evaporator and absorber, with a solvent circulation, a working substance circulation and a by-gas circulation, the working substance ammonia is expelled from a rich ammonia solution with continuous supply of thermal energy and subsequently is liquefied by heat absorption, is evaporated with absorption of heat from a cooling chamber and is absorbed from the weak ammonia solution, regulation of the thermal energy required for expulsion being effected in dependance on temperature changes with relation to a given temperature of the cooling chamber with the aid of an electronical module using fuzzy logic rules.

32 Claims, 3 Drawing Sheets

METHOD FOR OPERATING AN ABSORPTION REFRIGERATION UNIT AS WELL AS AN ABSORPTION REFRIGERATION UNIT

BACKGROUND OF THE INVENTION

The invention relates to a method for operating an absorption refrigerating unit including an expeller, condenser, evaporator and absorber with a solvent circulation with a solvent alternating between strong and weak concentrations, a working substance circulation with a condition of the working substance alternating between being dissolved in the solvent, gaseous and liquid, a by-gas circulation with a by-gas alternating between strong and weak concentration of the working substance, wherein the working substance is expelled from the solution rich in working substance with supply of thermal energy and subsequently is liquefied by heat absorption, is evaporated under absorption of heat from a chamber to be cooled and is absorbed from the solution weak in working substance, and wherein the by-gas serves as carrier for the working substance between the evaporation phase and the absorption phase. The invention further relates to an absorption refrigerating unit for carrying out the method as well as a refrigerator equipped with an above-described absorption refrigerating unit.

Absorption refrigerating units in contrast to compression refrigerating units operated with a mechanically operated condenser are operated with thermal energy. The possibility to allow working with a heat generator, like a gas burner, in addition to electrical energy, led to an extended use of absorption refrigerating units of the kind cited in the beginning in small-size refrigerating units for camping vehicles, boats and the like. Furthermore, absorption refrigerating units are used where noise-lessly working refrigerators are required, e.g. so-called minibars for self-service in hotel rooms.

Figure 2:
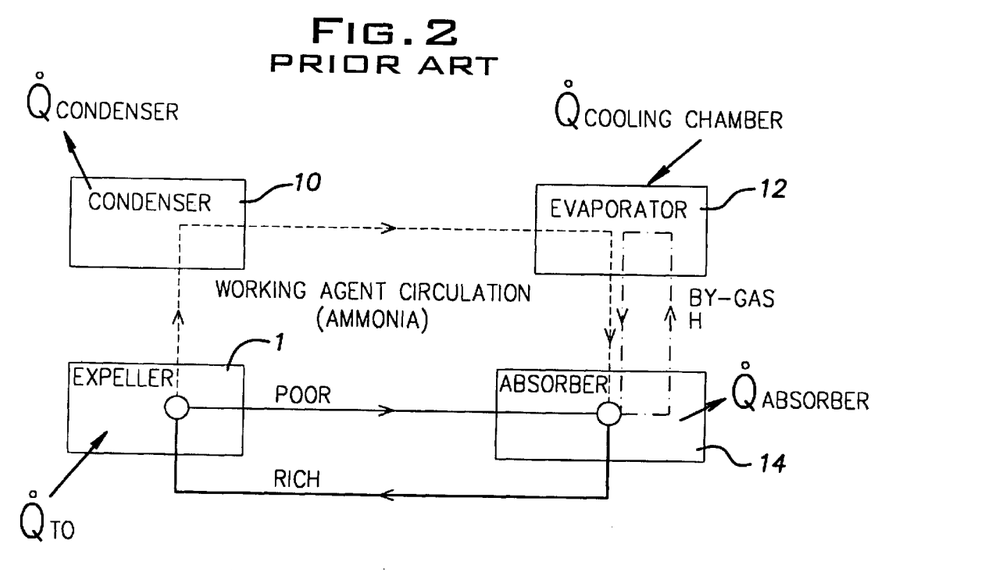
FIG. 2 shows the course of method in principle in an absorption refrigerating unit.
Figure 3:
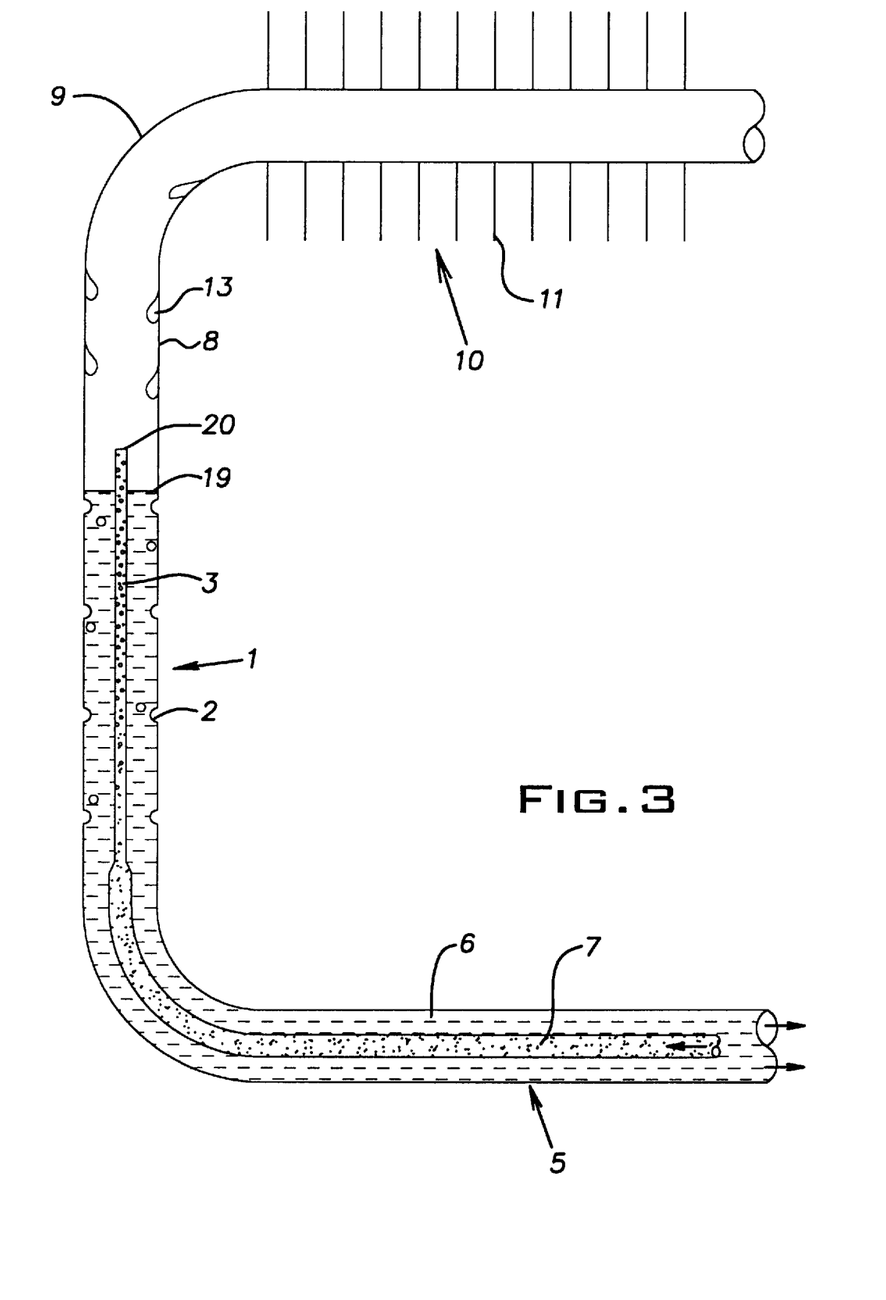
FIG. 3 shows the heater and the condenser of an absorption refrigerating unit in accordance with the present invention with water separator disposed therebetween.

An absorption refrigerating unit comprises the main components schematically indicated in FIG. 2, namely expeller, condenser, evaporator and absorber. Furthermore, it has to be distinguished between three circulations, namely a solvent circulation, a working substance circulation and a by-gas circulation, the solvent in the present field of application being water or an aqueous ammonia solution, respectively, the working substance being ammonia and the by-gas being hydrogen or helium.

The complete lines in FIG. 2 represent the solvent circulation showing to mass circulations of different ammonia concentration, a flow shown in thin line having weak concentration (poor in the working substance ammonia) and a flow shown in thicker line having strong concentration (rich in the working substance ammonia).

The dotted line in contrast thereto shows the working substance circulation. In the expeller the ammonia is separated from the strongly concentrated solution by supply of heat and subsequently is liquefied in the condenser by heat absorption. The evaporation process of the liquid ammonia in the evaporator extracts heat from the cooling chamber on a low temperature level. The gaseous ammonia then flows into the absorber and is absorbed by the solvent weak in ammonia. Thus, the cooling circulation is closed.

The dash-dotted lines in the right-hand portion of FIG. 2 show the by-gas circulation, wherein the by-gas is formed from hydrogen. In the lower portion of the absorber the hydrogen is strongest enriched with ammonia gas, while the ammonia concentration decreases to the upper portion of the absorber, because the ammonia is absorbed from the weak solution flowing in opposite direction. The lower the ammonia concentration the lighter is the by-gas so that it can rise upwardly to the evaporator in the absorber. Almost pure hydrogen is present in the evaporator. In the evaporator the pure by-gas mixes with the evaporated ammonia so that the gas mixture becomes heavy and presses down to the absorber, therein simultaneously pushing the lighter gas mixture from a container in the absorber pipe windings in front of itself. Thus, the by-gas circulation is closed.

As the three circulations are in mutual connection via the pipe system of the absorption refrigerating unit, the change in one circulation causes changes in the other two circulations.

Figure 1:
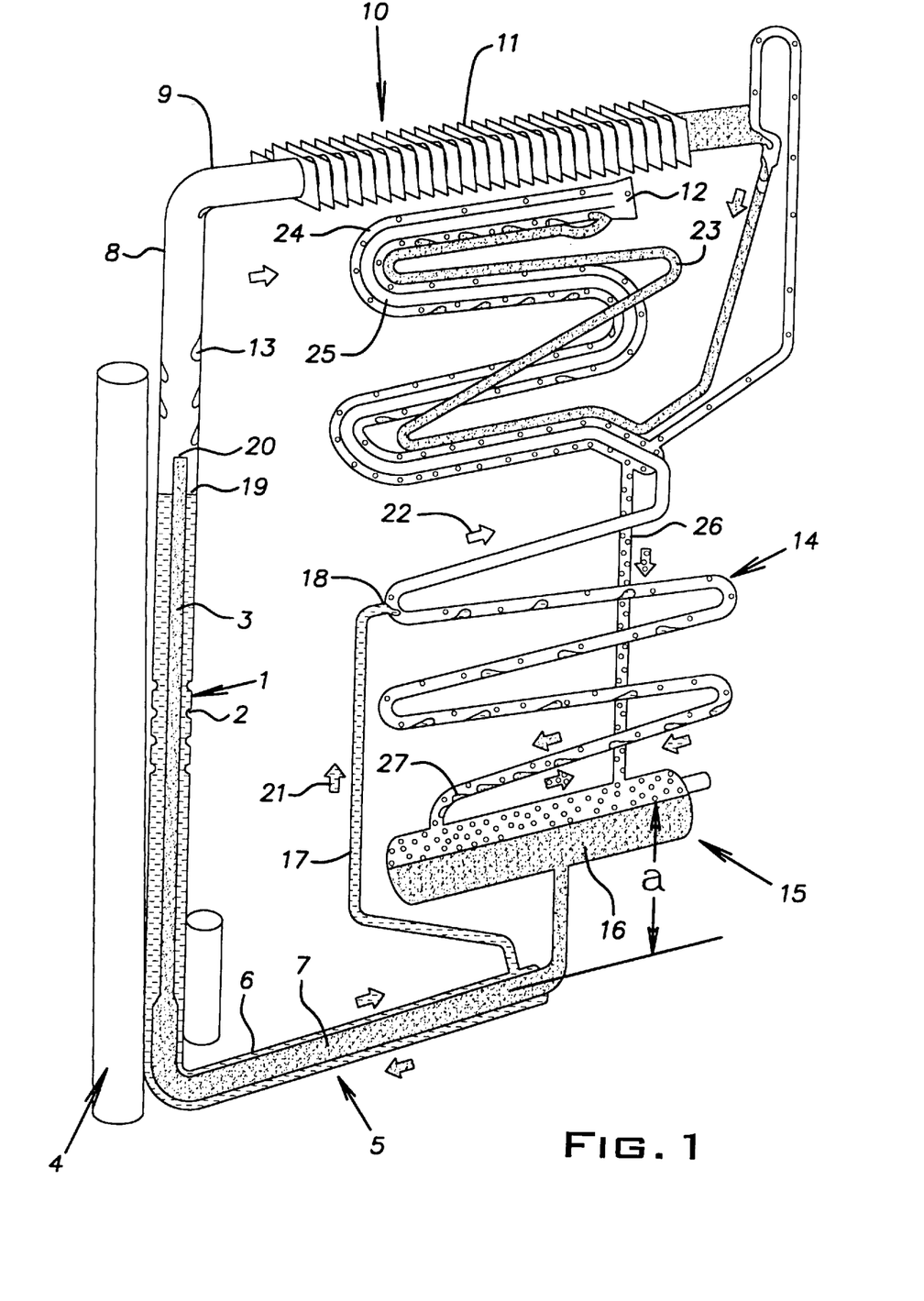
FIG. 1 is a schematic view of the absorption refrigerating unit in accordance with the present invention.

In FIG. 1 further details of the absorption refrigerating unit in accordance with the present invention are shown.

The expeller is built as vapor bubble pump in which a pump is arranged within a cylindrical heater pipe heatable from the outside and in which the rich solution is introduced from bottom side. Upon heating the ammonia evaporates from the water solution and raises upwardly in the pump pipe in form of bubbles. The difference in density between the liquid present in the pump pipe and enriched with vapor bubbles and the rich solvent column, "a" in FIG. 1, causes circulation of the solvent, wherein the solvent reaches the absorber as weak solution via an inlet pipe in counterflow direction to the rich solution.

The rising ammonia vapor contains a small portion of water which is to a great extent expelled in the pipe piece located between the expeller and the condenser. This pipe piece thus serves as water separator.

A line out of two concentrical pipes leads into the input of the expeller. In the inner tube the rich solution is fed to the expeller, while in the outer tube the weakly concentrated solution which was heated on the expeller flows back. The concentrical pipe piece thus serves as liquid counterflow heat exchanger in which the heat from the weak solution is transferred to the rich solution so that the latter reaches the expeller in pre-heated form.

An absorption refrigerating unit of the kind as described above under FIG. 2 is regulated by a thermostat arranged on the evaporator in the cooling chamber. If the temperature in the cooling chamber drops below a given desired value of e.g. 4° C., the heating means of the expeller is switched off so that the temperature in the heater area will drop to such extent that the pure solvent no longer is heated. This means that the solvent circulation is interrupted. As a consequence, no ammonia vapor or liquid ammonia in the condenser, respectively, is made available so that the working substance circulation is interrupted. Thereby, also the gas circulation is interrupted, because no rich, heavy gas mixture is produced, flows downwardly and pushes the weak gas mixture in front of itself to the evaporator any longer. When the operation of the absorption refrigerating unit has stopped, the temperature in the cooling chamber increases. As soon as the temperature reaches a given threshold value, e.g. 8° C., the heating means again is started by the thermostat regulation in order to again increase the meanwhile severely cooled temperature in the area of the heater to the temperature of about 160° to 200°. With maximum power input the heater area now is heated to 160° to 200°, still no ammonia being expelled during the heating process. It can be assumed that the operation of the absorption refrigerating unit only is started after 2 to 20 minutes and the above-described circulations have established themselves. Only from this time on cooling power is made available, wherein then cooling is effected down to a lower temperature than the desired temperature of 6° C., before the system is switched off resulting from thermostat control. Thermostat control is effected in the modes:

ON—FULL POWER—OFF.

The advantages of an absorption refrigerating unit of the above-described kind, like simple construction without moving parts and noise-less maintenance-free operation, are opposed by the essential disadvantage of a comparatively high energy demand so that a comparatively low efficiency with respect to cooling power is given. Numerous attempts and proposals to improve efficiency up to now only resulted in success to a very low degree. The reason lies in the complex cooperation of the method and device parameters depending on one another which have to be exactly tuned to match one another. When the refrigerating unit is started, no cooling power will be achieved until, after a longer heating period, ammonia is produced and made available in the evaporator. During this heating period maximal energy has to be supplied. Due to the intermittent regulation of the refrigerating unit it cannot be avoided either that too much liquid ammonia is made available in the evaporator, which will not be evaporated in the evaporator completely but in the gas heat exchanger or in the connecting line between evaporator and absorber. This means that the excess amount of ammonia cannot be utilized for the desired cooling in the cooling chamber but represents a loss.

SUMMARY OF THE INVENTION

It is, therefore, an object of the present invention to substantially improve the efficiency of a generic absorption refrigerating unit, i.e. of substantially reducing energy consumption with improved output.

In accordance with the present invention, thermal energy for expelling the working substance from the solution rich in working substance is continuously supplied to the expeller via the heating means. Therein, in accordance with the invention, regulation of thermal energy required for expelling is carried out depending on temperature changes with respect to a given temperature essentially remaining constant in the chamber to be cooled. If the temperature in the refrigerator increases by $\delta\epsilon\mu\nu\alpha T$, more thermal energy is supplied to the heater via the heating means so that more ammonia vapor is made available in the expeller or more ammonia, respectively, in the evaporator via the condenser. If the temperature in the cooling chamber drops below a desired value, immediately an adapted control of the heating means will occur in view of a reduced power consumption so that less ammonia is made available in the evaporator. The temperature changes are in advantageous manner detected by at least one sensor disposed in the air area of the chamber to be cooled.

In contrast to the traditional intermittent operating mode under the on/off mode, the regulation of thermal energy required for expellation now is effected with an electronic module making use of fuzzy logic rules. Energy consumption is continually adapted with the aid of said fuzzy logic rules so that only comparatively low temperature variations occur in the chamber to be cooled, which are due to disturbing factors like opening of the refrigerator, posing warmer foodstuff and the like therein.

The use according to the present invention of the electronic module with fuzzy logic regulation also permits controlling the operating time of the absorption refrigerating unit. Because of the continuous heat supply and the control with the aid of the electrical module using fuzzy logic rules, a substantially improved efficiency of the absorption refrigerating unit is achieved, wherein control is effected only in comparatively small $\delta\epsilon\mu\nu\alpha T$ regions about the desired value, the evaporator temperature need not be as low as compared to a thermostatic control. If, however, a higher evaporator temperature level is possible, this means on the other hand that it is not required to evaporate as much ammonia as in case of thermostatic operation. This again means that the gas mixture in the absorber need not be as poor as in case of intermittent operation but may be richer. Thereby, the partial pressure difference between the poor gas mixture and the ammonia becomes less so that less ammonia is evaporated. As the gas mixture in the absorber in the area of the input pipe needs not to be as poor as in case of intermittent operation, also the poor solvent supplied through the input pipe to the absorber can have a higher ammonia concentration, i.e. be richer. If, however, the concentration in the poorer solvent is higher than in intermittent operation, this means that the temperature required in the heater can be on a lower temperature level than in case of intermittent operation. While in case of intermittent operation this temperature region lies at about 160° to 200° C., the temperature level can be lowered to 140° to 150° C. in case of the continuous supply of thermal energy in accordance with the present invention. This advantageously results in less energy being required and, due thereto, lower losses will occur. A lower temperature in the heater area and a higher concentration of the working agent ammonia also mean that a smaller amount of water comes about in the water separator.

In accordance with the present invention the concentration of the working agent in the poor solution of 10 to 17 percent in case of intermittent operation or discontinuous supply of thermal energy, respectively, is raised to 20 to 25 percent in case of continuous supply of thermal energy.

In a further embodiment of the operating process in accordance with the present invention it is provided for that the operating pressure for reduction of energy consumption of about 19.5 bar in case of discontinuous supply of thermal energy is reduced to about 15.5 bar in case of continuous supply of thermal energy.

When the concentration of the poor solution is increased, this means vigorous heating in the expeller. Due thereto, solution circulation per heated ammonia amount is reduced. Therefore, it is provided for that the circulating amount of the solvent circulation as compared to discontinuous supply of thermal energy is increased, i.e. accelerated, by shortening the pump pipe of the expeller. This, however, results in that the level of the weak solution has to be lowered with respect to a unit with intermittent operation so that it is made sure that the weak solution cannot flow back into the pump pipe of the heater. According to the present invention the level of the weak solution can be lowered in that the ratio of cross-sections of flow of the solution poor in working agent of the expeller in the pump area to the input pipe in the absorber is reduced as compared to discontinuous supply of thermal energy. For example, the cross-section of the input pipe can be increased with unchanged external diameter of the expeller so that lower friction loss occurs in the input pipe and thus the level of the poor solution is lowered in the expeller, i.e. in the area surrounding the pump pipe. Lowering of the level is chosen for safety reasons such that the rising ammonia gas bubbles in the external pipe cannot co-transfer solvent particles in that the solvent can flow back into the pump pipe.

As in the water separator, i.e. in the area between the expeller and the condenser, less water vapor will occur. Since, according to the present invention, condensation of the water from the vapor in the transition from the expeller to the condenser is shortened, as compared to a unit with discontinuous supply of thermal energy. This is achieved in that the expeller, via the water separator by means of a knee, directly merges into the condenser. Otherwise, the temperature in the water separator would become so low that ammonia would liquify in the water separator already and would flow back, and thereby increase energy consumption. As the water separator is shorter, lower energy losses than in discontinuous operation will occur. As the transition from expeller to condenser is shortened in the present invention, but on the other hand it has to be made sure that liquefied ammonia is made available at the evaporator, it is provided for in advantageous manner that heat dissipation in the condenser is increased as compared to operation with discontinuous heat supply in that the condenser has an increased heat transfer area made available as compared to intermittent operation. This results in a better heat dissipation as well as a complete condensation of gaseous ammonia, underheating of the condensate causing improvement of efficiency. The above-mentioned reduction of operating pressure from 19.5 bar to about 15.5 bar because of provision of an enlarged cooling surface in the condenser area does not cause output reduction.

For generation of thermal energy electrical energy can be used in advantageous manner, this kind of energy preferably being used for minibars in hotel rooms. In mobile vehicles, like camping cars or boats, it, however, also is conceivable that other energy generators are used, like burners using liquid, gaseous or solid fuels. Regulation of these burners can be effected by means of the electronic module using fuzzy logic rules by means of valve control or control of oxygen supply or the like.

The absorption refrigerating unit in accordance with the present invention which is used for carrying out the above method and whose basic components have already been described above is characterized in that these components of the unit are designed for a continuous supply of thermal energy and are matching one another. Thus, the expeller may be formed as straight pipe extending vertically which, in accordance with the present invention, directly merges into the condenser with a knee. Because of the short connection excessive cooling down of the ammonia vapor is avoided so that the ammonia vapor does not condense in the solvent separator (water separator) already but only occurs in the subsequent enlarged condenser. In this way, the loss of utilizable coolant is minimized. In addition, thermal losses to the environment are avoided so that the amount of heat to be introduced in the heater area can be reduced for this reason, too. The reduction of the heater temperature brings about the advantage that the refrigerating unit is subjected to less thermal load. As has already been mentioned, electrical power consumption can be reduced because of the only lower temperature level required.

The length of the solvent separator can, for example, be 35 to 55 percent of the pump pipe length. The pump pipe of the expeller on the other hand can be reduced in length with respect to the pump pipe of an expeller for intermittent operation, e.g. by 3 percent, thus bringing about the advantage that the amount of heat to be introduced can be reduced and the expellation process slowed down because of the lower temperature level is accelerated.

For making sure that with shortened pump pipe the continuous cooling operation is maintained it is further provided for in inventive manner that the inlet pipe for the poor solution has a cross-section corresponding to 0.35 to 0.55 times the flow cross-section for the poor solution in the expeller. This permits to reduce flow losses in the inlet pipe of the absorber so that the level of the poor solution in the expeller is lowered and namely such that it always is located below the upper port of the pump pipe so that it is avoided that poor solution can flow back through the pump pipe. Further, it is provided for in advantageous manner that the condenser is enlarged as compared to a condenser of an absorption refrigerating unit with intermittent operation. Better heat dissipation is achieved by the enlargement of the heat transfer area, e.g. number and size of cooling ribs, so that it is guaranteed that in spite of the short path the gaseous ammonia condenses completely and the condensate is undercooled. This improves efficiency of the absorption refrigerating unit.

Already the apparatus-specific improvements over traditional absorption refrigerating units produce a clear increase in efficiency which, however, can be further improved by the continuous heat supply in accordance with the present method.

Finally it is provided for that the expeller has a heating means in cup-like manner encompassing the cylindrically formed expeller. In this manner at first an optimum heat transfer surface is created so that heat introduction into the heater is improved. In addition, thermal losses in the heater area can be avoided in that the heating means has an thermal insulation to the outside. As heating means e.g. an electrical resistance heater or alternatively a burner means can be used, wherein the latter can alternatively be operated with gas, liquid fuel or solid fuel.

In further preferred embodiment of the invention it is provided for that the housing of the refrigerator equipped with the absorption refrigerating unit is insulated with vacuum insulation panels. When vacuum panels are used, the evaporator temperature need not be low in comparison to a refrigerator with polyurethane insulation. The above-named improvement possibilities in continuous operation then are intensified with respect to thermostatic operation.

BRIEF DESCRIPTION OF THE DRAWINGS

Further features, advantages and details of the invention will be seen from the following description of a preferred embodiment with reference to the drawings, wherein.

DETAILED DESCRIPTION OF THE PREFERRED EMBODIMENT

In FIG. 1 the expeller 1 of the absorption refrigerating unit can be recognized, which has the shape of a cylindrical pipe with beads 2 incorporated in the circumference thereof. The expeller 1 is formed as a heater in which a pump pipe 3 which is open to the top side is arranged concentrically. A heating means 4 which e.g. may be formed by an electrical resistance heater or a burner system is disposed on the outside of the expeller 1.

A heat exchanger 5 consisting of an outer pipe 6 and an inner pipe 7 merges into the expeller from the bottom. In the inner pipe 7, the solution rich in ammonia is fed to the expeller, while the solution poor in ammonia flows back in the annular space between the inner pipe 7 and the outer pipe 6. The inner pipe 7 merges into the pump pipe 3 which has a smaller diameter than the inner pipe, within the expeller 1.

The outer pipe of the expeller 1 continues in the water separator 8 perpendicularly extending upwardly and merging into a knee 9 which again merges into the condenser 10. The condenser 10 is equipped with a series of cooling ribs 11.

When the outer pipe of the expeller or heater 1 is heated by the heating means 4, the heat is transferred through the poor solution located in the annular space between the outer pipe of the expeller 1 and the pump pipe 3 to the rich solution located in the pump pipe 3, whereby the dissolute ammonia is expelled in form of bubbles rising in the pump pipe. The gas bubbles reduce the weight of the liquid column within the pump pipe 3 with respect to the liquid column in the ambient annular chamber so that a flow in upward direction in the pump pipe and in downward direction in the annular chamber comes about. Since the concentration of the ammonia in the pump pipe 3 is higher than in the annular chamber, increased ammonia gas formation occurs in the pump pipe 3, while only few ammonia gas bubbles still rise in the ambient annular chamber.

The gaseous ammonia rises through the water separator 8 and via the knee 9 reaches the condenser 10 in which it condensates into liquid with water dissipation. The condenser 10 is slightly inclined in the direction of flow (to the right-hand side in FIG. 1) so that the condensated liquid ammonia flows away in direction to the evaporator 12.

Depending on the prevailing pressure and temperature conditions, a small amount of the water in which the ammonia is dissolved will evaporate, too. This water will settle in the water separator 8 in form of drops 13 and flows back into the poor solution. The comparatively short pipe piece of the water separator 8 is sufficient for separating the water without a premature condensation of the ammonia occurring prior to entry into the condenser 10. The effective length of the water separator 8 amounts to about 45 percent of the length of the pump pipe 3.

In the right-hand half of FIG. 1 the absorber 14 is shown. The concentric inner pipe 7 of the heat exchanger 5 merges into the bottom side of a reservoir 15 in which rich ammonia solution is located in the lower portion. The outer pipe 6 of the heat exchanger 5 merges into a vertical inlet pipe 17 merging into the absorber 14 in position 18. As the level 19 of the poor ammonia solution in the expeller 1 is higher than the inlet 18, it is guaranteed that a flow in direction of arrow 21 will occur. On the other hand, the pump pipe end 20 is arranged above the liquid level 19 and the liquid level is regulated in that the cross-sectional relations from pump pipe 3 to inlet pipe 17 are chosen correspondingly. It can also be provided for that a suitable choker by means of which the flow in direction of arrow 21 can be influenced is located in, for example, the inlet pipe 17.

By way of the inlet pipe 17, the poor ammonia solution reaches the pipe loops of the absorber 14 and flows into the latter down to the container 15. Therein ammonia gas is absorbed from the by-gas (hydrogen or helium) flowing upwardly in direction of arrow 22 so that the ammonia concentration grows weaker and weaker and finally almost pure by-gas flows in upward direction above the inlet 18 in the piping of the absorber. By way of the gas heat exchanger, the by-gas reaches the evaporator 12 where it absorbs the liquid ammonia supplied via the pipe 23 and changes into vapor phase in the evaporator 12.

As can be seen, the evaporator 12 comprises an outer pipe 24 and a concentrical inner pipe 25 through which the by-gas, namely hydrogen, reaches the evaporator. In the outer pipe the by-gas, having become more heavy due to absorption of ammonia vapor, is guided downwardly and, through a connecting line 26, reaches the upper portion of the container 15. As the ammonia from the by-gas is absorbed by means of the drops 27 of the weak solution, the by-gas becomes lighter and again rises in the piping windings of said absorber 14 in correspondence with arrows 22 in the upward direction, so that the by-gas circulation is closed. Simultaneously, due to increasing absorption of ammonia the poor solvent becomes rich solvent 16 which is again guided to the expeller 1 through the inner pipe 7 of the heat exchanger.

Figure 4:
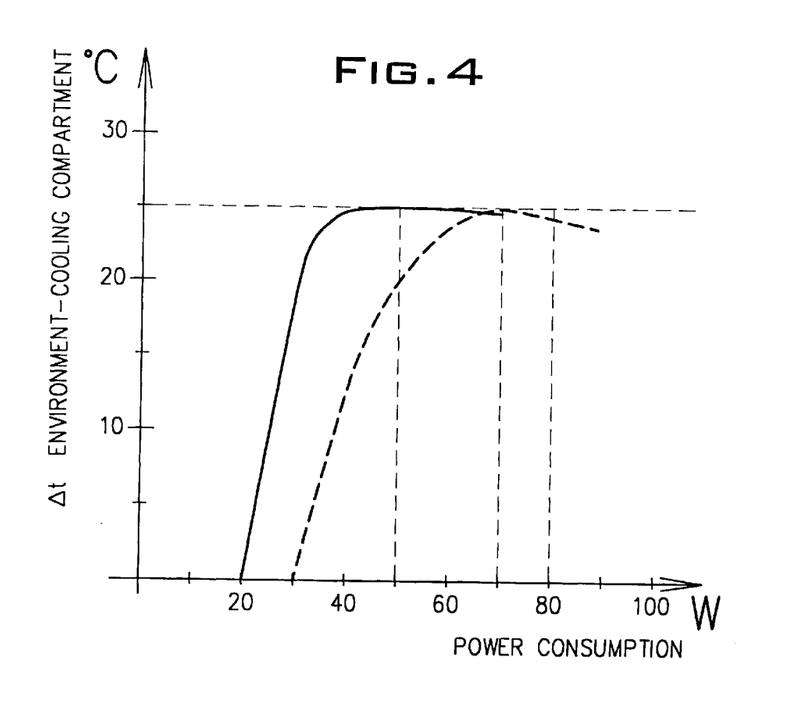
FIG. 4 is an efficiency diagram.

In FIG. 4 the temperature difference between environment and cooling compartment in ° C. is shown with respect to power consumption of said heating means 4 in Watt. The full line and the dashed line show absorption refrigerating units with continuous power consumption, in which regulation of thermal energy required for expellation is effected in dependance on temperature changes with the aid of an electronic module using fuzzy logic rules. While the full line shows an apparatus in accordance with the present invention in which all individual components of the unit are designed for a continuous supply of thermal energy and are harmonized with one another, as has been described above, the dashed line shows an absorption refrigerating unit which is operated continuously but in which such harmonization of components has not been effected. When comparing the curves of the diagram it can be clearly seen that the apparatus in accordance with the present invention at different temperature differences needs substantially less thermal energy than the device not harmonized in construction.

| List of reference numerals | | | |
|---|---|---|---|
| 1 | expeller | 15 | reservoir |
| 2 | bead | 16 | rich ammonia solution |
| 3 | pump pipe | 17 | inlet pipe |
| 4 | heating means | 18 | inlet |
| 5 | liquid heat exchanger | 19 | level of poor ammonia solution |
| 6 | outer pipe | 20 | pump pipe end |
| 7 | inner pipe | 21 | flow |
| 8 | water separator | 22 | flow of by-gas |
| 9 | knee | 23 | pipe |
| 10 | condenser | 24 | outer pipe |
| 11 | cooling rib | 25 | inner pipe |
| 12 | evaporator | 26 | connecting line |
| 13 | drop | 27 | drop |
| 14 | absorber | 28 | gas heat exchanger |

What is claimed:

1. A method for operating an absorption refrigerating unit comprising an expeller (1), a condenser (10), an evaporator (12) and an absorber (14), with a solvent circulation with a solvent changing between rich and poor concentrations of a working agent, wherein the concentration of working agent in the poor solution is 20 to 25 percent, a working agent circulation with a working agent changing between a condition dissolved in the solvent, a gaseous and a liquid condition, a by-gas circulation with a by-gas changing between rich and poor concentrations of the working agent, wherein said working agent is expelled from the solution rich in working agent under supply of thermal energy and subsequently is liquified under heat dissipation, is evaporated under heat absorption from a chamber to be cooled and is absorbed by the solution poor in working agent, and wherein said by-gas serves as a carrier for the working agent between the evaporation phase and the absorption phase, wherein the thermal energy for expelling the working agent from the solution rich in working agent is supplied continuously, the amount of supplied thermal energy is regulated by a control unit to provide the necessary cooling, and the expellation temperature is in the range of 140° C. to 150° C.

2. A method as defined in claim 1, wherein the regulation of the thermal energy required for expellation is effected in dependance on temperature changes with respect to a given essentially constant temperature in the chamber to be cooled.

3. A method as defined in claim 2, wherein said temperature changes are detected by at least one sensor arranged in the air space of the chamber to be cooled.

4. A method as defined in claim 1, wherein the regulation of the temperature of the chamber to be cooled for any case of operation is effected by a given heat supply for expelling the working agent in the expeller.

5. A method as defined in claim 1, wherein the regulation of the thermal energy required for expellation is effected using an electronic module using fuzzy logic rules.

6. A method as defined in claim 1, wherein the operating pressure is about 15.5 bar at continuous supply of thermal energy.

7. A method as defined in claim 1, wherein the circulation amount of the solvent circulation is increased as compared to absorption refrigerating units having a discontinuous supply of thermal energy.

8. A method as defined in claim 1, wherein the ratio of flow cross-sections of the solution poor in working agent, of the expeller (1) in the pump area to the inlet pipe (17) in the absorber (14) is reduced as compared to absorption refrigerating units having a discontinuous supply of thermal energy.

9. A method as defined in claim 6, wherein condensation of the water from the vapor in the transition from the expeller (1) to the condenser (10) is reduced as compared to absorption refrigerating units having a discontinuous supply of thermal energy.

10. A method as defined in claim 6, wherein heat dissipation in the condenser (10) is increased as compared to absorption refrigerating units having a discontinuous supply of thermal energy.

11. A method as defined in claim 1, wherein electrical energy is used for generating the thermal energy.

12. A method as defined in claim 1, wherein for generation of the thermal energy liquid, gaseous or solid fuels are used.

13. A method as defined in claim 11, wherein the solvent is water, the working agent is ammonia, and the by-gas is hydrogen.

14. An absorption refrigerating unit for carrying out the method of claim 1, comprising
a pump pipe (3) vertically arranged in the heatable expeller (1),
a solvent separator (8) subsequent to said expeller (1),
a condenser (10) subsequent to said solvent separator (8) and slightly inclined downwardly in direction of low,
an evaporator (12) subsequent to said condenser (10) and arranged in the chamber to be cooled,
an absorber (14) subsequent to said evaporator (12) and
an inlet pipe (17) for introducing the solution poor in working agent into said absorber (14), wherein the individual components of the unit are designed for continuous supply of thermal energy and are harmonized with one another.

15. An unit as defined in claim 14, wherein said solvent separator (8) is formed as straight pipe extending vertically and directly following said pump pipe (3) of said expeller (1) and said solvent separator is connected to said condenser (10) with a knee.

16. An unit as defined in claim 14, wherein the length of the pipe forming said solvent separator (8) amounts to 35 to 55 percent of the length of said pump pipe (3).

17. An unit as defined in claim 14, wherein said pump pipe (3) of said expeller (1) is shortened as compared to the pump pipe of an expeller for intermittent operation.

18. An unit as defined in claim 14, wherein said inlet pipe (17) for the poor solution has a cross-section corresponding to 0.35 to 0.55 times the flow cross-section for the poor solution in said expeller (1).

19. An unit as defined in claim 14, wherein said condenser (10) is enlarged as compared to a condenser for intermittent operation.

20. An unit as defined in claim 14, wherein said expeller (1) comprises a heating means (4) adjacent the cylindrically shaped expeller.

21. An unit as defined in claim 20, wherein said heating means (4) is formed by an electrical resistance heater or alternatively by a burner means.

22. An unit as defined in claim 21, wherein said heating means (4) is thermally insulated to the outside.

23. Absorption refrigerating unit comprising
a pump pipe (3) vertically arranged in the heatable expeller (1),
a solvent separator (8) subsequent to said expeller (1),
a condenser (10) subsequent to said solvent separator (8) and slightly inclined downwardly in direction of flow,
an evaporator (12) subsequent to said condenser (10) and arranged in the chamber to be cooled,
an absorber (14) subsequent to said evaporator (12) and
an inlet pipe (17) for introducing a solution poor in working agent into said absorber (14), wherein the individual components of the unit are designed for generally continuous supply of thermal energy and are optimized for power increase such that
said solvent separator (8) is formed as straight pipe extending vertically and directly following said pump pipe (3) of said expeller 81) and merging into said condenser (10) with a knee (9) and
the length of the pipe forming said solvent separator (8) amounts to 35 to 55 percent of said pump pipe (3) and
said pump pipe (3) of said expeller (1) is shortened to an admissible minimum and
said inlet pipe (17) for the poor solution has a cross-section corresponding to 0.35 to 0.55 times the flow cross-section for the poor solution in said expeller (1).

24. An unit as defined in claim 23, wherein said expeller (1) comprises a heating means (4) adjacent said cylindrically formed expeller.

25. An unit as defined in claim 24, wherein said heating means (4) is formed by an electrical resistance heater or alternatively by a burner means.

26. An unit as defined in claim 25, wherein said heating means (4) is thermally insulated to the outside.

27. Refrigerator with an absorption refrigerating unit as defined in claim 23, wherein the housing of said refrigerator is insulated with vacuum insulation panels.

28. Absorption refrigerating unit comprising
a pump pipe (3) vertically arranged in the heatable expeller (1), a solvent separator (8) subsequent to said expeller (1), a condenser (10) subsequent to said solvent separator (8) and slightly inclined downwardly in direction of flow, an evaporator (12) subsequent to said condenser (10) and arranged in the chamber to be cooled, an absorber (14) subsequent to said evaporator (12) and an inlet pipe (17) for introducing a solution poor in working agent into said absorber (14), wherein the individual components of the unit are designed for generally continuous supply of thermal energy and are optimized for power increase such that the length of the pipe forming said solvent separator (8) amounts to 35 to 55 percent of said pump pipe (3) and said inlet pipe (17) for the poor solution has a cross-section corresponding to 0.35 to 0.55 times the flow cross-section for the poor solution in said expeller (1).

29. An unit as defined in claim 28, wherein said expeller (1) comprises a heating means (4).

30. An unit as defined in claim 29, wherein said heating means (4) is formed by an electrical resistance heater or alternatively by a burner means.

31. An unit as defined in claim 30, wherein said heating means (4) is thermally insulated to the outside.

32. Refrigerator with an absorption refrigerating unit as defined in claim 31, wherein the housing of said refrigerator is insulated with vacuum insulation panels.

* * * * *

UNITED STATES PATENT AND TRADEMARK OFFICE
CERTIFICATE OF CORRECTION

PATENT NO.  : 5,865,039
DATED       : February 2, 1999
INVENTOR(S) : Muller et al.

It is certified that error appears in the above-indentified patent and that said Letters Patent is hereby corrected as shown below:

Column 19, Line 59, Claim 14, delete "low" and insert --flow--.

Signed and Sealed this

Twentieth Day of July, 1999

Attest:

Q. TODD DICKINSON

*Attesting Officer*                *Acting Commissioner of Patents and Trademarks*